United States Patent
Alonso-Miralles

(10) Patent No.: US 11,801,934 B2
(45) Date of Patent: Oct. 31, 2023

(54) ACOUSTIC REDIRECTION SYSTEMS AND METHODS FOR URBAN AIR MOBILITY VEHICLES

(71) Applicant: ROHR, INC., Chula Vista, CA (US)

(72) Inventor: Jose S. Alonso-Miralles, Chula Vista, CA (US)

(73) Assignee: ROHR, INC., Chula Vista, CA (US)

( * ) Notice: Subject to any disclaimer, the term of this patent is extended or adjusted under 35 U.S.C. 154(b) by 75 days.

(21) Appl. No.: 17/239,061

(22) Filed: Apr. 23, 2021

(65) Prior Publication Data

US 2022/0340271 A1 Oct. 27, 2022

(51) Int. Cl.
*B64C 27/20* (2023.01)

(52) U.S. Cl.
CPC .................................... *B64C 27/20* (2013.01)

(58) Field of Classification Search
CPC ..... B64C 27/20; B64C 11/001; B64C 11/007; B64C 2220/00
See application file for complete search history.

(56) References Cited

U.S. PATENT DOCUMENTS

| | | | |
|---|---|---|---|
| 3,640,489 A * | 2/1972 | Jaeger | B64C 39/001 244/23 C |
| 4,955,962 A * | 9/1990 | Mell | F02C 9/26 244/135 C |
| 10,040,548 B2 | 8/2018 | Alzahrani | |
| 10,460,717 B2 | 10/2019 | Beckman et al. | |
| 10,766,615 B1 * | 9/2020 | Quarrie | B64C 29/0025 |
| 10,814,966 B2 | 10/2020 | Rowe et al. | |
| 2003/0213869 A1 * | 11/2003 | Scott | B64C 27/20 244/12.2 |
| 2004/0069901 A1 * | 4/2004 | Nunnally | B64C 27/20 244/34 R |
| 2008/0156422 A1 * | 7/2008 | Vontell | B32B 37/10 156/228 |
| 2018/0208296 A1 * | 7/2018 | Mores | B64C 11/46 |
| 2018/0208305 A1 * | 7/2018 | Lloyd | B60L 50/90 |
| 2018/0305004 A1 | 10/2018 | Rowe et al. | |

FOREIGN PATENT DOCUMENTS

| | | | |
|---|---|---|---|
| CN | 105966601 | * | 9/2016 |
| CN | 07600399 | * | 1/2018 |
| CN | 109533286 | | 3/2019 |
| KR | 1790281 | | 10/2017 |

OTHER PUBLICATIONS

European Patent Office, European Search Report dated Aug. 17, 2022 in Application No. 22169738.6.

* cited by examiner

*Primary Examiner* — Joshua J Michener
*Assistant Examiner* — Ashesh Dangol
(74) *Attorney, Agent, or Firm* — SNELL & WILMER L.L.P.

(57) ABSTRACT

An acoustic system for an Urban Air Mobility (UAM) vehicle may comprise a first shield configured to be disposed around a rotor of the UAM vehicle, the first shield having an annular shape, the first shield configured to be disposed radially outward from a blade tip of a rotary blade, the first shield configured to redirect sound waves from a substantially radial direction to a second direction, the second direction being orthogonal to the radial direction.

12 Claims, 5 Drawing Sheets

ACOUSTIC REDIRECTION SYSTEMS AND METHODS FOR URBAN AIR MOBILITY VEHICLES

FIELD

The present disclosure relates to acoustic redirection systems and methods, and more specifically, to acoustic redirection systems and methods for Urban Air Mobility (UAM) vehicles.

BACKGROUND

Urban Air Mobility (UAM) vehicles, or Air Taxis, is a fast developing technology forecasted to operate in major U.S. cities in 2030. UAM vehicles may be much quieter relative to helicopters. Due to still being in preliminary development, various obstacles to wide adoption of UAM vehicles still remain.

SUMMARY

An acoustic system for an Urban Air Mobility (UAM) vehicle is disclosed herein. The acoustic system may comprise: a first shield configured to be disposed around a rotor of the UAM vehicle, the first shield having an annular shape, the first shield configured to be disposed radially outward from a blade tip of a rotary blade, the first shield configured to redirect sound waves from a substantially radial direction to a second direction, the second direction being orthogonal to the radial direction.

In various embodiments, the first shield comprises a radially inner surface having a concave shape. The first shield may comprise an upper angled wall and a lower angled wall, a first inner surface of the upper angled wall configured to form a first acute angle with a strut, a second inner surface of the lower angled wall configured to form a second acute angle with the strut. The acoustic system may further comprise the rotor. The acoustic system may further comprise a central hub, the rotor configured to rotate around the central hub, the first shield spaced apart radially from the central hub. The acoustic system may further comprise a second shield configured to be disposed around a second rotor and a third shield configured to be disposed around a third rotor, the second shield and the third shield in accordance with the first shield. The acoustic system may further comprise a fourth shield configured to be disposed around a fourth rotor, the fourth shield in accordance with the first shield.

A rotor system for an Urban Air Mobility (UAM) vehicle is disclosed herein. The rotor system may comprise: a central hub; a drive shaft operably coupled to the central hub; at least two rotary blades extending radially outward from the drive shaft; and a shield spaced apart radially outward from the at least two rotary blades, the shield being annular in shape, the shield configured to redirect sound waves from a substantially radial direction to a second direction, the second direction being orthogonal to the substantially radial direction.

In various embodiments, the shield comprises a radially inner surface having a concave shape. The rotor system may further comprise at least two struts extending from the central hub radially outward to the shield. The shield may comprise an upper angled surface and a lower angled surface, the upper angled surface forming a first acute angle with the at least two struts, the lower angled surface forming a second acute angle with the at least two struts. The rotor system may form a portion of a propulsion system for the UAM vehicle. The shield may comprise a thermoplastic material.

An Urban Air Mobility (UAM) vehicle is disclosed herein. The UAM vehicle may comprise: an airframe defining a cabin; and a propulsion system comprising a plurality of rotor systems, each rotor system including: a central hub; a drive shaft operably coupled to the central hub; at least two rotary blades configured to rotate about the central hub; and a shield having an acoustic redirection system, the shield having an annular shape.

In various embodiments, the shield of each rotor system is spaced apart radially from a blade tip of a rotary blade in the at least two rotary blades. The acoustic redirection system of each rotor system is configured to redirect sound waves from a substantially radial direction to a second direction, the second direction being substantially orthogonal to the substantially radial direction. The shield of each rotor system may comprise a radially inner surface having a concave shape. The rotor system may further comprise at least two struts extending from the central hub radially outward to the shield. The shield of each rotor system may comprise an upper angled wall and a lower angled wall, a first internal surface of the upper angled wall forming a first acute angle with the at least two struts, a second internal surface of the lower angled wall forming a second acute angle with the at least two struts. The UAM vehicle may further comprise a plurality of support arms, each support arm configured to structurally support a corresponding rotor system in the plurality of rotor systems.

The foregoing features and elements may be combined in various combinations without exclusivity, unless expressly indicated otherwise. These features and elements as well as the operation thereof will become more apparent in light of the following description and the accompanying drawings. It should be understood, however, the following description and drawings are intended to be exemplary in nature and non-limiting.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the following illustrative figures. In the following figures, like reference numbers refer to similar elements and steps throughout the figures.

DETAILED DESCRIPTION

The detailed description of exemplary embodiments herein makes reference to the accompanying drawings, which show exemplary embodiments by way of illustration. While these exemplary embodiments are described in sufficient detail to enable those skilled in the art to practice the disclosures, it should be understood that other embodiments may be realized and that logical changes and adaptations in design and construction may be made in accordance with this disclosure and the teachings herein. Thus, the detailed description herein is presented for purposes of illustration only and not of limitation.

The scope of the disclosure is defined by the appended claims and their legal equivalents rather than by merely the examples described. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to tacked, attached, fixed, coupled, connected or the like may include permanent, removable, temporary, partial, full and/or any other possible attachment option. Additionally, any reference to without contact (or similar phrases) may also include reduced contact or minimal contact. Surface shading lines may be used throughout the figures to denote different parts but not necessarily to denote the same or different materials.

Figure 1:
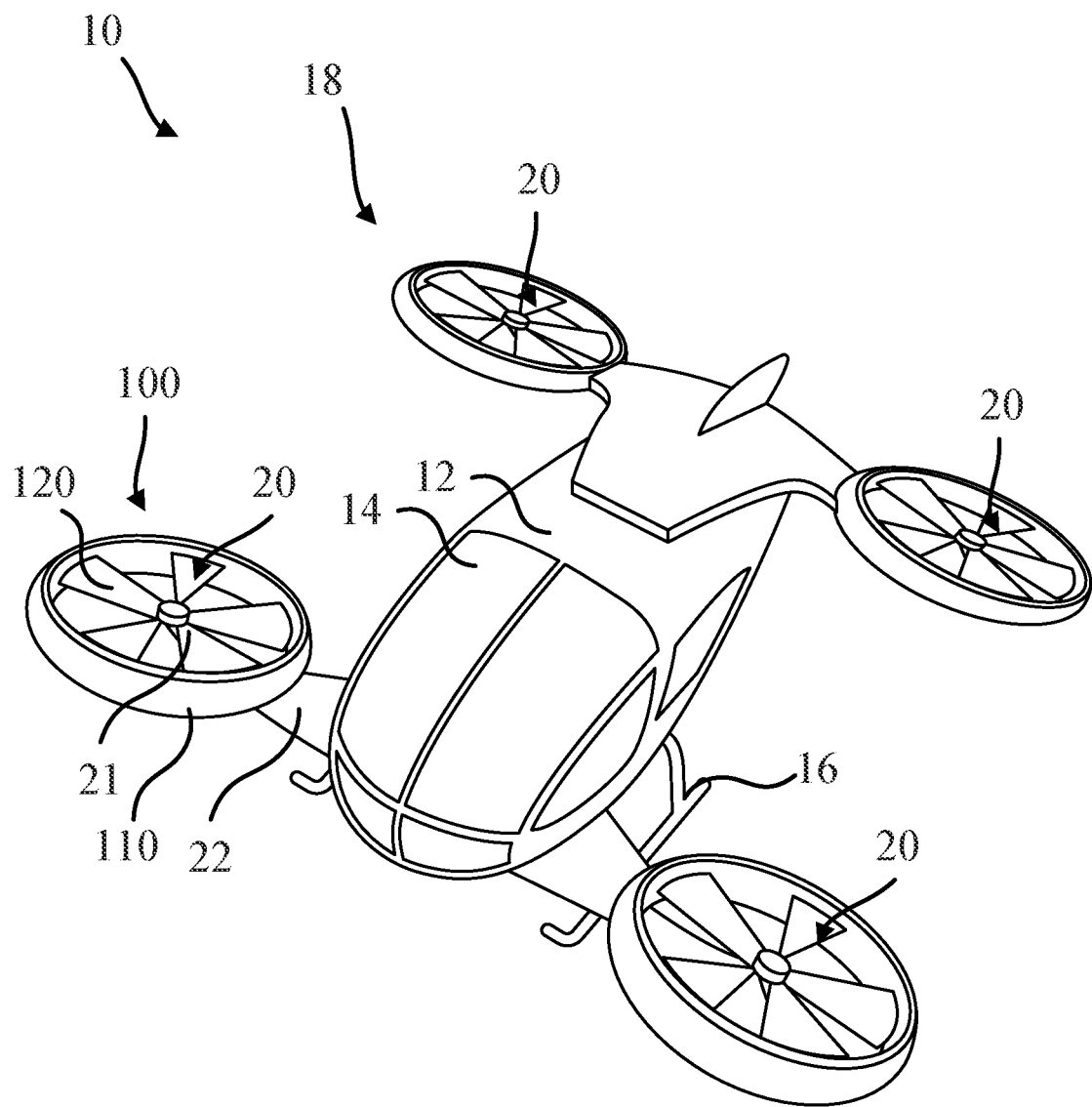
FIG. 1 illustrates a perspective view of an Urban Air Mobility vehicle, in accordance with various embodiments.

Referring now to FIG. 1, a perspective view of an Urban Air Mobility (UAM) vehicle 10 may include an airframe 12 defining a cabin 14, landing skids 16, and a propulsion system 18. Although illustrated as including landing skids 16, any type of landing gear is within the scope of this disclosure. In various embodiments, the propulsion system 18 includes a plurality of rotor systems 20. Although illustrated as including four rotor systems 20, any number of rotor systems is within the scope of this disclosure.

In various embodiments, each rotor system in the plurality of rotor systems 20 may be configured for a fixed angle of attack (i.e., including a rotor configured to maintain a same plane relative to the airframe 12) or configured for a variable angle of attack (i.e., including a rotor configured to operate in variable planes relative to the airframe 12). In this regard, each rotor system in the plurality of rotor systems 20 may be moveable over any number of degrees of freedom. For example, each rotor system in the plurality of rotor systems 20 may be configured to vary pitch, roll, and/or yaw of a respective rotor in the plurality of rotor system 20.

In various embodiments, the UAM vehicle 10 may further comprise a support arm 22 for each rotor system in the plurality of rotor system 20. For example, a first rotor system 21 in the plurality of rotor systems 20 includes a support arm 22 extending outward from the airframe 12 to a shield 110 of an acoustic redirection system 100. In various embodiments, the support arm 22 extends outward in a horizontal direction (e.g., parallel to a ground surface when UAM vehicle 10 is on the ground surface +/−30 degrees). Although described herein as being +/−30 degrees from a ground surface, the present disclosure is not limited in this regard. For example, one skilled in the art may recognize various angles for a support arm 22 and still be within the scope of this disclosure. The support arm 22 may couple a rotor system (e.g., first rotor system 21) to the airframe 12, in accordance with various embodiments.

In various embodiments, the UAM vehicle 10 further comprises an acoustic redirection system for each rotor system in the plurality of rotor system 20. For example, UAM vehicle 10 includes the acoustic redirection system 100 for the first rotor system 21. The acoustic redirection system 100 includes a shield 110 disposed radially outward from a rotor 120 of first rotor system 21. The shield 110 is annular in shape and configured to surround the rotor in the radially outward direction. In various embodiments, the acoustic redirection system 100 is configured to re-direct sound radiation (i.e., in a direction orthogonal to the radial direction) below and above the UAM vehicle 10. "Below" as defined herein refers to a direction towards a ground surface when the UAM vehicle 10 is on a ground surface (e.g., when skids 16 are in contact with the ground surface). "Above" as defined herein refers to a direction away from a ground surface when the UAM vehicle 10 is on the ground surface. In this regard, the acoustic redirection system 100 is configured to re-direct sound waves, in accordance with various embodiments. In various embodiments, by utilizing acoustic redirection system 100 as described herein, the UAM vehicle 10 may limit noise to a vertical direction. In this regard, the UAM vehicle 10 may be configured to take off and land vertically over a community airport or the like, and the acoustic redirection system 100 is configured to ensure the noise of the rotor 120 is limited to the airport, in accordance with various embodiments.

Figure 2:
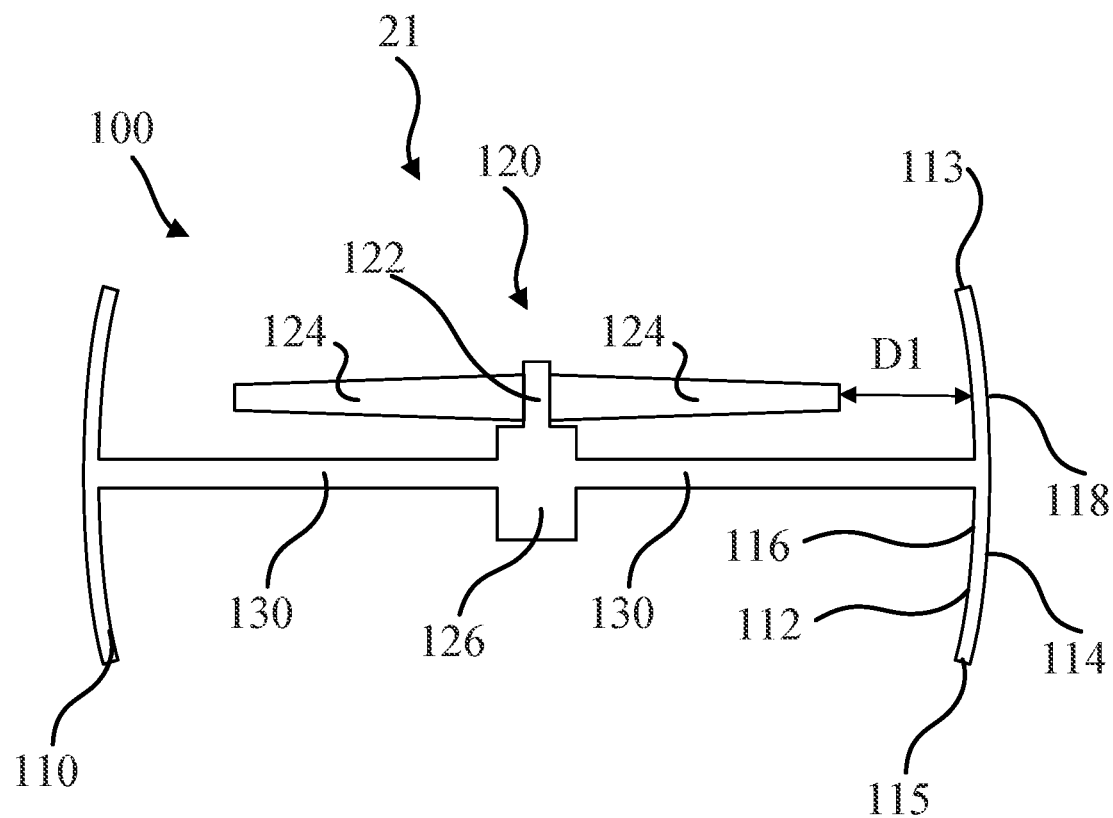
FIG. 2 illustrates a cross sectional view of an acoustic system for a UAM vehicle, in accordance with various embodiments.

Referring now to FIG. 2, a cross-section view of an acoustic redirection system 100 for the UAM vehicle 10 from FIG. 1 is illustrated, in accordance with various embodiments. In various embodiments, the acoustic redirection system 100 includes the shield 110 disposed radially outward of the rotor 120. The rotor 120 includes a drive shaft 122 and rotary blades 124 and a hub 126. Any number of rotary blades 124 is within the scope of this disclosure. The drive shaft 122 and the rotary blades 124 are configured to rotate about the hub 126 to generate lift and/or thrust to propel UAM vehicle 10 from FIG. 1, in accordance with various embodiments. In various embodiments, the acoustic redirection system 100 further comprises at least two struts 130 coupling the hub 126 to the shield 110. The at least two struts 130 provide structural support for the rotor 120, in accordance with various embodiments.

In various embodiments, the shield 110 is annular in shape and extends axially from a first end 113 to a second end 115. The shield 110 is spaced apart from rotary blades in a radial direction by a distance D1. In various embodiments, the distance D1 is sized and configured to limit any impact on lift generated by the rotor 120. In this regard, shield 110 is sized and configured for acoustic redirection while limiting an impact to aerodynamics of the first rotor system 21, in accordance with various embodiments.

In various embodiments, the shield 110 includes a radially inner surface 112 and a radially outer surface 114. In various embodiments, the radially inner surface 112 defines a concave surface 116, and the radially outer surface 114 defines a convex surface 118. In various embodiments, the shield 110 is configured to redirect sound waves from a substantially radial direction to a substantially vertical direction. "Substantially," as referred to herein is +/−30° relative to the direction specified, in accordance with various embodiments. By redirecting sound waves from a radial direction to a substantially vertical direction an area effected by noise from the UAM vehicle 10 from FIG. 1 may be significantly reduced, in accordance with various embodiments. For example, the UAM vehicle 10 may have community airports (i.e., pickup and drop off locations for the UAM vehicle 10 from FIG. 1). In this regard, the UAM vehicle 10 may take off vertically to a predetermined height above the airport prior to traveling to a destination. During the time from take off until the predetermined height, sound may be directed in an upward direction via the shield 110 and a downward direction via the shield 110. Since the community airport may be below the UAM vehicle 10 from FIG. 1 during the take off event, only the community airport may here the noise. Thus, a surrounding community may experience little to no sound from the propulsion system 18 of the UAM vehicle 10 due to the shield 110 of the acoustic redirection system 100, in accordance with various embodiments.

Figure 3:
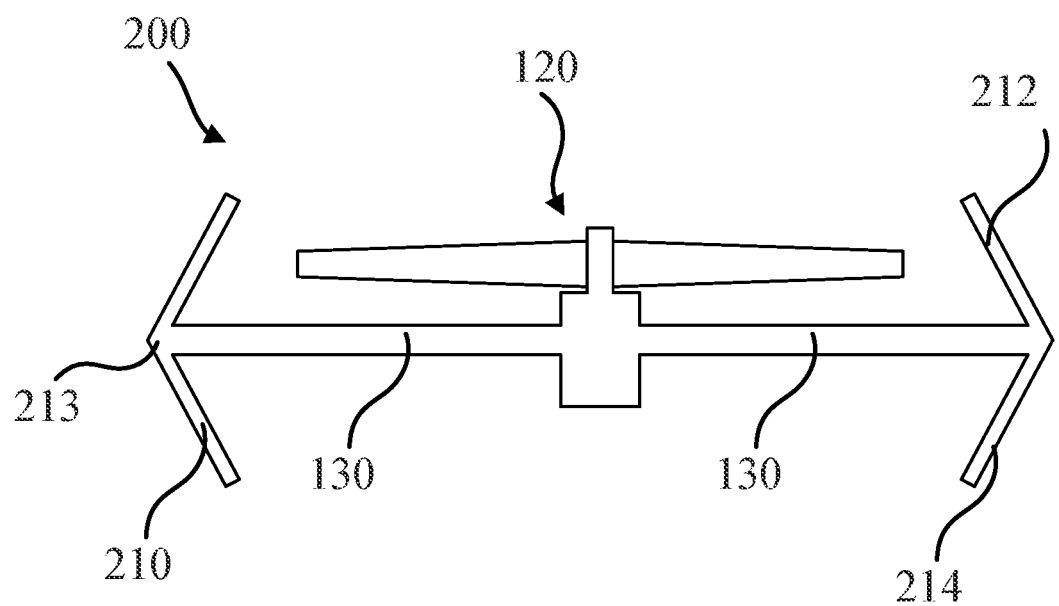
FIG. 3 illustrates a cross sectional view of an acoustic system for a UAM vehicle, in accordance with various embodiments

Referring now to FIG. 3, a cross-section view of an acoustic redirection system 200 for the UAM vehicle 10 from FIG. 1 is illustrated, in accordance with various embodiments. In various embodiments, the acoustic redirection system 200 may comprise a shield 210 comprising angled walls (i.e., upper wall 212 and lower wall 214). An internal surface of the angled walls 212, 214 may form an acute angle with the at least two struts 130, in accordance with various embodiments. In this regard, the angled walls 212, 214 of the shield 210 may be configured to redirect sound waves from the rotor 120, during operation of the UAM vehicle 10 from FIG. 1, from a substantially radial direction to a substantially vertical direction similar to the concave surface 116 of shield 110 from FIG. 2, in accordance with various embodiments. In various embodiments, the at least two struts 130 may be coupled to a vertex 213 of angled walls 212, 214.

Figure 4:
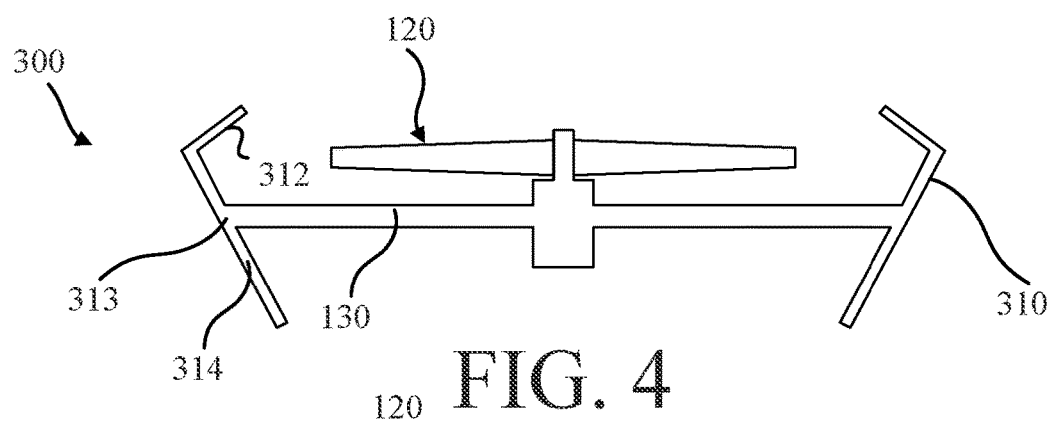
FIG. 4 illustrates a cross sectional view of an acoustic system for a UAM vehicle, in accordance with various embodiments
Figure 5:
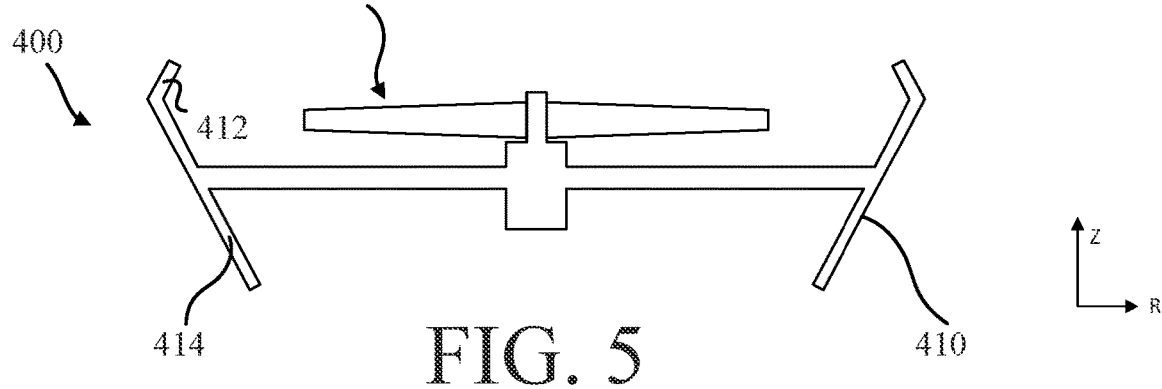
FIG. 5 illustrates a cross sectional view of an acoustic system for a UAM vehicle, in accordance with various embodiments

In various embodiments, with brief reference to FIG. 4, the at least two struts 130 may be coupled to a lower wall 314 directly with the upper wall 312 being disposed above (i.e., in a positive z-direction defined by axis of rotation for rotor 120) from an intersection 313 between lower wall 312 and the at least two struts 130. In various embodiments, angled walls of an acoustic redirection system 300, 400 may form a perpendicular angle (e.g., angled walls 312, 314 of acoustic redirection system 300 of FIG. 4) or an obtuse angle (e.g., angled walls 412, 414 of acoustic redirection system 400 of FIG. 5). In various embodiments, the acoustic redirection systems 300, 400 are configured to redirect a majority of the sound waves in a positive Z-direction (i.e., in a forward direction as defined by the rotor 120). Thus, by redirecting a majority of sound waves in a positive Z-direction, a decibel level below and outward from the UAM vehicle 10 from FIG. 1 may be significantly reduced relative to a UAM vehicle without acoustic redirection systems 300, 400.

Figure 6:
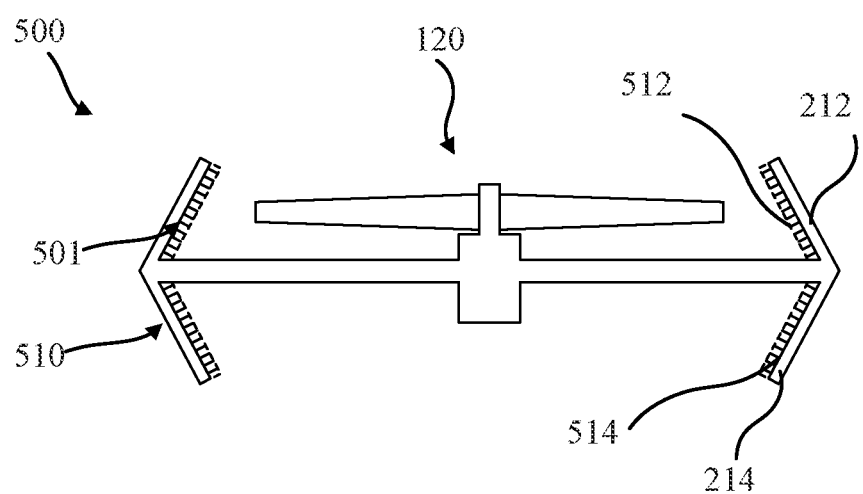
FIG. 6 illustrates a cross sectional view of an acoustic system for a UAM vehicle, in accordance with various embodiments.

Referring now to FIG. 6, a cross-sectional view of an acoustic system 500 is illustrated, in accordance with various embodiments. In various embodiments, the acoustic system 500 is in accordance with acoustic redirection system 200 and further comprising an acoustic absorption system 501. The acoustic absorption system 501 is configured to at least partially absorb sound waves from the rotor 120, in accordance with various embodiments.

In various embodiments, the acoustic absorption system 501 comprises a shield 510 including acoustic liners 512, 514 coupled to the angled walls 212, 214 respectively. In various embodiments, the acoustic liners 512, 514 may each comprise a perforated screen, a backskin and a honeycomb core disposed between the backskin and the perforated screen, in accordance with various embodiments. In various embodiments, the backskin may be adjacent to the angled walls 212, 214 and the perforated screen may be disposed radially inward toward the hub of rotor 120.

In various embodiments, the shields 110, 210, 310, 410, 510 from FIGS. 2 and 3 are light weight components configured to reduce noise propagation from the propulsion system 18 from FIG. 1 in a radial direction. For example, shields 110, 210, 310, 410, 510 may be non-structural components (i.e., shields 110, 210 may not support rotor 120 in a structural manner). The shields 110, 210, 310, 410, 510 may be made of a thermoplastic material such as polycarbonate, acrylic, polystyrene, high-density polyethylene, or the like. In various embodiments, acoustic redirection system 100, 200, 300, 400 and acoustic system 500 from FIG. 1-6 may provide cost and weight benefits, in addition to noise reduction benefits for UAM vehicle 10 from FIG. 1. For example, typical UAM vehicles have open ended rotors, which propagate sound radially. When a typical UAM vehicle is flying at a low altitude, the sound propagating radially may impact a community. Thus, by surrounding the rotor 120 with shield 110, 210, 310, 410, or 510, in accordance with various embodiments, the sound waves may be redirected, at least partially in a vertical direction (i.e., in a direction of travel defined by rotor 120) and/or managed to reduce noise within a particular radius of a UAM vehicle 10 from FIG. 1.

Benefits, other advantages, and solutions to problems have been described herein with regard(s) to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosures. The scope of the disclosures is accordingly to be limited by nothing other than the appended claims and their legal equivalents, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

Systems, methods and apparatus are provided herein. In the detailed description herein, references to "various embodiments", "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is intended to invoke 35 U.S.C. 112(f), unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. An acoustic system for an Urban Air Mobility (UAM) vehicle, the acoustic system comprising:
   a first shield configured to be disposed around a rotor of the UAM vehicle, the first shield having an annular shape, the first shield configured to be disposed radially outward from a blade tip of a rotary blade, the first shield configured to redirect sound waves from a substantially radial direction to a second direction, the second direction being orthogonal to the substantially radial direction, wherein a cross-section of the first shield comprises:
      a first linear wall and a second linear wall, the first linear wall and the second linear wall defining a vertex, the first linear wall extending from the vertex upward at a first acute angle relative to a strut, the second linear wall extending downward at a second acute angle relative to the strut, the vertex disposed above an intersection between the strut and the second linear wall.

2. The acoustic system of claim 1, further comprising the rotor.

3. The acoustic system of claim 2, further comprising a central hub, the strut extending from the central hub to the first shield, the rotor configured to rotate around the central hub, the first shield spaced apart radially from the central hub.

4. The acoustic system of claim 1, further comprising a second shield configured to be disposed around a second rotor and a third shield configured to be disposed around a third rotor.

5. The acoustic system of claim 4, further comprising a fourth shield configured to be disposed around a fourth rotor.

6. A rotor system for an Urban Air Mobility (UAM) vehicle, the rotor system comprising:
   a central hub;
   a drive shaft operably coupled to the central hub;
   at least two rotary blades extending radially outward from the drive shaft; and
   a shield spaced apart radially outward from the at least two rotary blades, the shield being annular in shape, the shield configured to redirect sound waves from a substantially radial direction to a second direction, the second direction being orthogonal to the substantially radial direction;
   a first strut extending from the central hub radially outward to the shield; and
   a second strut extending from the central hub radially outward to the shield, wherein a cross-section of the shield comprises:
      a first linear wall and a second linear wall, the first linear wall and the second linear wall defining a vertex, the first linear wall extending from the vertex vertically upward at a first acute angle relative to the first strut, the second linear wall extending vertically downward at a second acute angle relative to the first strut, the vertex disposed above an intersection between the first strut and the second linear wall.

7. The rotor system of claim 6, wherein the rotor system forms a portion of a propulsion system for the UAM vehicle.

8. The rotor system of claim 6, wherein the shield comprises a thermoplastic material.

9. An Urban Air Mobility (UAM) vehicle, comprising:
   an airframe defining a cabin; and
   a propulsion system comprising a plurality of rotor systems, each rotor system including:
      a central hub;
      a drive shaft operably coupled to the central hub;
      at least two rotary blades configured to rotate about the central hub;
      a shield having an acoustic redirection system, the shield having an annular shape
      a first strut extending from the central hub radially outward to the shield; and
      a second strut extending from the central hub radially outward to the shield, wherein
   a cross-section of the shield comprises:
      a first linear wall and a second linear wall, the first linear wall and the second linear wall defining a vertex, the first linear wall extending from the vertex upward at a first acute angle relative to the first strut, the second linear wall extending downward at a second acute angle relative to the first strut, the vertex disposed above an intersection between the strut and the second linear wall.

10. The UAM vehicle of claim 9, wherein the shield of each rotor system is spaced apart radially from a blade tip of a rotary blade in the at least two rotary blades.

11. The UAM vehicle of claim 10, wherein the acoustic redirection system of each rotor system is configured to redirect sound waves from a substantially radial direction to a second direction, the second direction being substantially orthogonal to the substantially radial direction.

12. The UAM vehicle of claim 10, further comprising a plurality of support arms, each support arm configured to structurally support a corresponding rotor system in the plurality of rotor systems.

* * * * *

UNITED STATES PATENT AND TRADEMARK OFFICE
CERTIFICATE OF CORRECTION

| | | |
|---|---|---|
| PATENT NO. | : 11,801,934 B2 | |
| APPLICATION NO. | : 17/239061 | |
| DATED | : October 31, 2023 | |
| INVENTOR(S) | : Jose S. Alonso-Miralles | |

It is certified that error appears in the above-identified patent and that said Letters Patent is hereby corrected as shown below:

In the Claims

Claim 6, Column 8, Line 9: after the phrase "…extending from the vertex" please delete the word "vertically"

Claim 6, Column 8, Line 10: after the phrase "…second linear wall extending" please delete the word "vertically"

Signed and Sealed this
Thirteenth Day of February, 2024

*Katherine Kelly Vidal*

Katherine Kelly Vidal
*Director of the United States Patent and Trademark Office*